Figure 1:
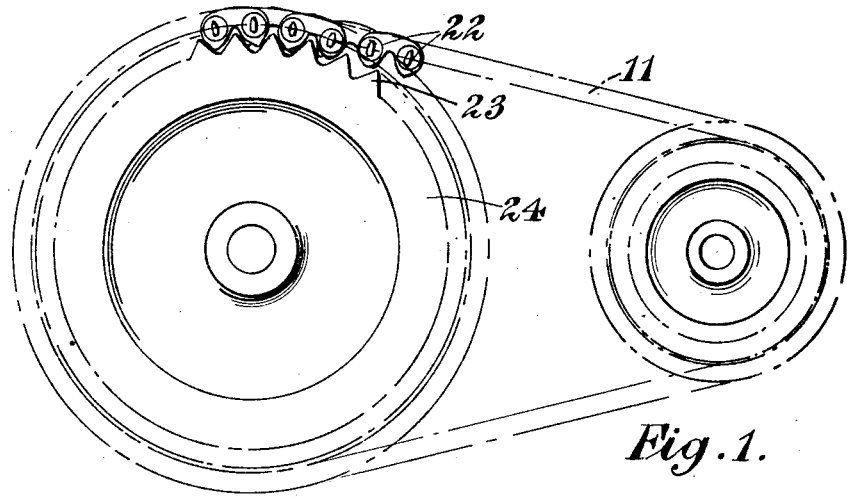

May 15, 1928. 1,669,654

R. S. CATTANACH

TRANSMISSION CHAIN

Filed Aug. 7, 1926

Rankin Scott Cattanach
Inventor
by Edwd. Vaulimbg
his Attorney

Patented May 15, 1928.

1,669,654

UNITED STATES PATENT OFFICE.

RANKIN SCOTT CATTANACH, OF COVENTRY, ENGLAND, ASSIGNOR TO THE COVENTRY CHAIN COMPANY LIMITED, OF COVENTRY, ENGLAND, A BRITISH COMPANY.

TRANSMISSION CHAIN.

Application filed August 7, 1926, Serial No. 127,911, and in Great Britain May 25, 1926.

This invention relates to transmission chains of the inverted tooth type, and it has for its object to provide a form of rocker joint which will be very durable and by its particular construction will render the chain quiet and efficient in use.

According to this invention, the joint is constituted by a floating rivet of non-circular section located between and engaging with a rolling action liners carried by the respective links connected thereby.

The contacting faces of the rivet and the liners may be of various forms as hereunder described, the essential feature being that when the links articulate, in entering or leaving a wheel, a rolling action takes place in the joint inasmuch as one liner will move through a definite angle as regards the other by rolling on the rivet, the rivet at the same time rolling on the other liner and thereby establishing a differential action of joint with a consequent tendency to decreased wear on the contacting rocker faces.

A further essential feature of the invention is that, with a chain under tension and in the straight, the points of contact between the liners and the rivet lie along a line which is below (or within) the pitch chord, and this condition also exists when the chain is wrapping a wheel having the minimum number of teeth (usually taken as 15), contact does not take place on the pitch chord.

In an inverted tooth chain of the ordinary plain pin type, the line joining the centres of the pins lengthways of any link is generally known as the pitch chord and any part of the chain or any point described as within or below the pitch chord means on that side which will be nearer the centre of a wheel with which the chain is meshing. Also the distance measured from the centre of any one pin to the face of the link which contacts with a wheel tooth is known as the link face distance.

Furthermore, after any articulation of a link, the link face remains tangential to a circle struck from the centre of the pin, and also the link face distance remains constant in value or at the same normal distance from the pin centre.

By the present invention, however, owing to the contact points being below the pitch chord during a given angle of articulation, the link face does not remain at a constant distance from the theoretical pitch point (or rivet centre) but retracts, producing the effect of a shortened link face and so giving a compensating action when entering or leaving a wheel, which tends to ease of engagement and consequent quietness of action.

In the accompanying drawings,

Figure 1 shows two different sized chain wheels coupled by a transmission chain in accordance with this invention, and Figures 2-5, on a larger scale than the foregoing, are end views respectively of different forms of joints in accordance with this invention.

Like numerals indicate like parts throughout the drawings.

In Figure 1, the position of the pitch chord line 11 on the chain is shown in respect of the teeth 23 of the larger of the two wheels 24.

Figure 2:
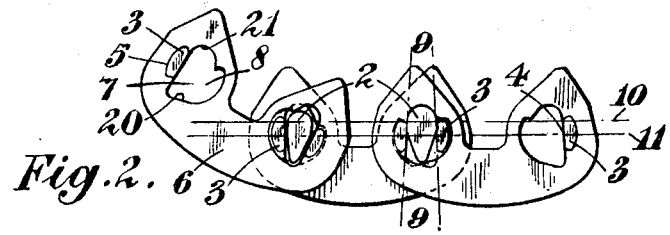

In the construction shown in Figure 2, the cross section of the rivet 2 is substantially ovoid, the larger end being towards the inner edge of the chain and the liners 3 having flat acting faces 4. The section of the liners is such that they can engage and be held by suitably shaped recesses 5 in the links 6, each liner engaging with each alternate link on one side of the rivet and the other liner engaging in a similar manner with a different series of links on the other side of the rivet. The perforation 7 in the link which admits the rivets and liners therefore provides at 5 for the retention of one liner, and at 8 for the relative angular movements of the other liner which is retained by the co-operating link.

With the chain straight, the flat opposing faces 4 of the two liners preferably diverge slightly from the inner to the outer side of the chain, as shown by the dotted lines at 9, and between them is located the rivet. The section of the latter, as above described, is such that, when in position between the two liners, it makes contact with the latter along lines 10 which are always within the pitch chord 11 of the chain, (see Figure 2) and as the links move angularly with respect to one another this relationship is retained notwithstanding the relative differential rolling movements of the rivet on the liners.

Figure 3:
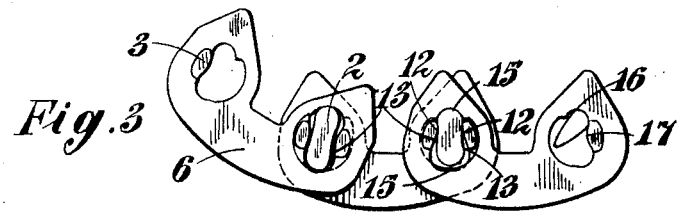

In the alternative arrangement shown in Figure 3, the section of the rivet 2 is somewhat modified, so that for about half its greatest width the opposite sides 12 are substantially parallel and thereafter diverge slightly as at 13 so that they are concave, the actual portions contacting with the liners being, or approximating to, arcs of circles. The ends 15 of this section are semi-circular, one end being of greater radius than the other. In this case the end having the greater radius is on the outer side of the chain. The acting faces of the liner instead of being flat as before are now made with bevels 16 extending to about their mid-width and joined at 17 with a curve or an arc of a circle of smaller radius than that on the rivet, thus providing a wide angled V-surface approximating to convexity which can co-operate with the concave surface on the rivet to produce the relative rolling effect.

Figure 4:
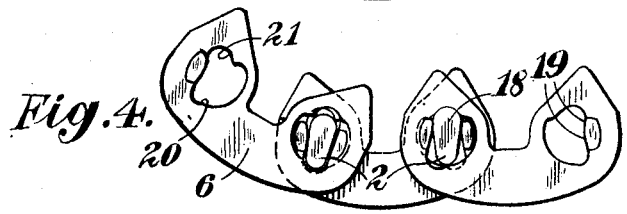

In another construction illustrated by Figure 4, the section of the rivet 2 broadly resembles that of the last described one, but the wider end 18 is located on the inner edge of the chain and the bevelled faces 19 of the liner are unsymmetrical, so that the correct contact position with the rivet is ensured.

In each of these constructions the relative rolling movement causes a slight thrust on the rivet, either to the inner or outer side of the chain, depending upon the construction, and the aperture 7 provided in each of the links is shaped as at 20 and 21 to the path swept out by the rivet ends so that any tendency to slip may be checked and the rivet retained in its correct functional relation to the liners.

Figure 5:
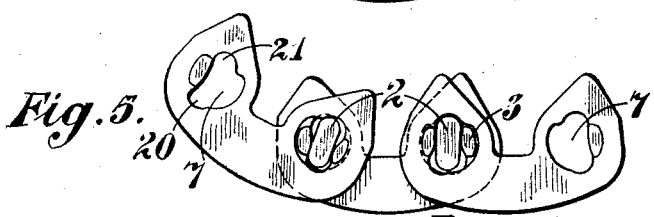

In a further modification illustrated in Figure 5, the section of the rivet 2 may be parallel sided with curved or semi-circular ends, as is clearly shown, the co-acting faces of the liners 3 being suitably modified but broadly resembling the last two types described in having convex or wide-angled V-surfaces, as before, to provide the correct relative rolling action upon the rivet.

In this last described arrangement, when the links articulate, no direct thrust inwards or outwards of the chain takes place as regards the rivet, and whilst the ends 20 and 21 of the aperture 7 in each of the links is shaped to conform to the path swept out by the rivet's ends, this is done only to provide clearance during action.

The rivet is preferably made endwise fast by means of washers 22 (see Figure 1) provided at its ends, of such diameter as to extend over the ends of the liners and to close completely the perforations 7 made in the links to receive the elements of the joint. As will be evident, these washers effectively exclude foreign matter and also prevent any endwise movement of the liners.

From the foregoing it will be seen that the invention can be carried out with various sections of rivets and liners, but in each case a similar effect is produced and exceptional quietness of running is obtained thereby.

What I claim as my invention and desire to secure by Letters Patent of the United States is:—

1. In a joint between link sections of a transmission chain formed with inverted teeth, the combination of a floating rivet of substantially ovoid section, a liner fixed in one link section, a similar liner fixed in the other link section, an aperture in each link to admit the rivet into a space between the two liners, and co-operating convex faces provided upon the rivet and upon the liners adapted to permit relative rolling of the rivet and liners when the links articulate, substantially as set forth.

2. In a joint for the links of a transmission chain having inverted teeth, the combination of a liner having a convex working face secured in one link, a clearance space in the link adjacent the liner, a similar liner and clearance space in the co-operating link, and a floating rivet of substantially ovoid section located in the clearance space between the two liners and adapted to engage them with a relative rolling movement when the links are articulated, substantially as set forth.

3. A transmission chain as claimed in claim 1, in which, when the chain is straightened under tension, the contact points of the rivet and liners lie along a line which is below the pitch chord, substantially as set forth.

4. A transmission chain as claimed in claim 1, in which the points of contact of the rivet and liners are below the pitch chord when the chain is wrapping any wheel larger than that having the minimum allowable number of teeth, substantially as set forth.

5. A transmission chain as claimed in claim 1, in which the rivet section is substantially ovoid and its major axis is transverse to the chain, substantially as set forth.

6. A transmission chain as claimed in claim 1, in which the cross section of the rivet is substantially ovoid and the liners have co-operating flat faces, and preferably these faces converge towards the inner side of the chain when the latter is straight, substantially as set forth.

7. A transmission chain as claimed in claim 1, in which the rivet section is wider at one end than the other and the wider portion is located towards the inner edge of the chain.

8. A transmission chain as claimed in claim 1, in which the rivet section is semi-circular at the ends, and the radius at one end is greater than that at the other, whilst the intermediate contours are slightly convex.

In testimony whereof I have signed my name to this specification.

RANKIN SCOTT CATTANACH.